United States Patent [19]

Yamakawa

[11] 4,291,655
[45] Sep. 29, 1981

[54] COMBUSTION CHAMBER OF AN INTERNAL COMBUSTION ENGINE

[75] Inventor: Yoshio Yamakawa, Toyota, Japan

[73] Assignee: Toyota Jidosha Kogyo Kabushiki Kaisha, Aishi, Japan

[21] Appl. No.: 50,559

[22] Filed: Jun. 21, 1979

Related U.S. Application Data

[62] Division of Ser. No. 778,230, Mar. 16, 1979, Pat. No. 4,166,436.

[30] Foreign Application Priority Data

Nov. 15, 1976 [JP]  Japan .............................. 51-136243

[51] Int. Cl.³ .............................................. F02B 3/00
[52] U.S. Cl. .................................... 123/306; 123/309; 123/193 H; 123/667
[58] Field of Search .......... 123/191 R, 191 M, 193 R, 123/193 H, 306, 309, 30 D, 30 E

[56] References Cited

U.S. PATENT DOCUMENTS

| | | | |
|---|---|---|---|
| 2,763,254 | 9/1956 | Klug | 123/191 M |
| 2,766,739 | 10/1956 | Kosche | 123/191 M |
| 2,887,101 | 5/1959 | Nallinger | 123/191 M |
| 4,000,722 | 1/1977 | May | 123/30 D |
| 4,121,544 | 10/1978 | May | 123/30 D |

FOREIGN PATENT DOCUMENTS

91382  7/1972  Fed. Rep. of Germany.

*Primary Examiner*—Craig R. Feinberg
*Attorney, Agent, or Firm*—Stevens, Davis, Miller & Mosher

[57] ABSTRACT

Disclosed is an internal combustion engine comprising a cylinder head and a piston. A recess is formed on the inner wall of the cylinder head or on the top surface of the piston. The recess defines a combustion chamber when the piston reaches the top dead center. The inner wall of the cylinder head has a flat surface portion. The top surface of the piston has a flat surface portion. A squish area is formed between the flat surface portions of the cylinder head and of the piston. A groove is formed on the inner wall of the cylinder head or on the top surface of the piston so as to extend towards the circumferential direction of the piston. The groove communicates the squish area with the recess. The bottom surface of the groove is smoothly connected to the bottom wall of the recess so as to create a turbulence and a strong swirl motion of the combustible mixture in the recess due to the squish flow pushed out from the squish area when the piston reaches the top dead center.

4 Claims, 13 Drawing Figures

COMBUSTION CHAMBER OF AN INTERNAL COMBUSTION ENGINE

This is a division of application Ser. No. 778,230, filed Mar. 16, 1979, now U.S. Pat. No. 4,166,436.

DESCRIPTION OF THE INVENTION

The present invention relates to an internal combustion engine, and particularly relates to a construction of the combustion chamber of an internal combustion engine.

As an effective method for simultaneously reducing an amount of harmful HC, CO and $NO_x$ components in the exhaust gas, there has been known a method in which a lean air-fuel mixture is used. However, in this method, since the flame speed is very low, there occurs such a disadvantage that a stable combustion cannot be obtained, thus causing the fluctuation of the torque.

On the other hand, as an effective method for reducing an amount of the harmful $NO_x$ components in the exhaust gas, there has been known a method in which the exhaust gas is recirculated from the exhaust system into the intake system of the engine. However, particularly when a large amount of the exhaust gas is recirculated into the intake system, the recirculated exhaust gas is not mixed with an air-fuel mixture in the cylinder of the engine. As a result of this, a stable combustion cannot be obtained, thus causing the fluctuation of the torque.

In addition, in order to obtain a stable combustion and to improve an output power of the engine by quickening the velocity of the combustion, a method is known in which the volume of the combustion chamber formed between the cylinder head and the top surface of the piston is reduced, that is, the compression ratio is increased so that the flame immediately propagates over the entire space of the combustion chamber. However, even if the volume of the combustion chamber is merely reduced, it is impossible to sufficiently quicken the velocity of the combustion. Particularly when a lean air-fuel mixture or a mixture containing a large amount of the recirculated exhaust gas therein is used, a satisfactory velocity of the combustion cannot be obtained. In addition, when the compression ratio is increased, there occurs a problem in that detonation is caused.

An object of the present invention is to provide an internal combustion engine in which the velocity of the combustion of a lean air-fuel mixture or of a mixture containing a large amount of the recirculated exhaust gas therein is quickened, whereby a stable combustion can be obtained, the occurrence of detonation also can be prevented and an amount of harmful components in the exhaust gas can be reduced.

According to the present invention, there is provided an internal combustion engine comprising a cylinder block, a cylinder head mounted on said cylinder block, a piston reciprocally movable in said cylinder block, said cylinder head and said piston defining a combustion chamber having a fixed volume therebetween when said piston reaches the top dead center, an intake valve in said cylinder head for leading a combustible mixture into said combustion chamber, an exhaust valve in said cylinder head for discharging the exhaust gas to the atmosphere, said combustion chamber comprising a first region which forms a substantial combustion chamber and has a circumferential wall and a bottom wall, said combustion chamber further comprising a second region for creating a squish flow of a combustible mixture and a third region communicating said first region with said second region and guiding said squish flow towards the circumferential direction of said piston for causing a direct impingement of said squish flow upon the bottom wall of said first region and for creating a turbulence and a strong swirl motion of the combustible mixture in said first region, and a spark plug having a spark gap located in said combustion chamber.

The present invention may be more fully understood from the following description of the preferred embodiments of the invention, together with the accompanying drawings.

DESCRIPTION OF PREFERRED EMBODIMENT

DESCRIPTION OF PREFERRED EMBODIMENTS

Figure 1:
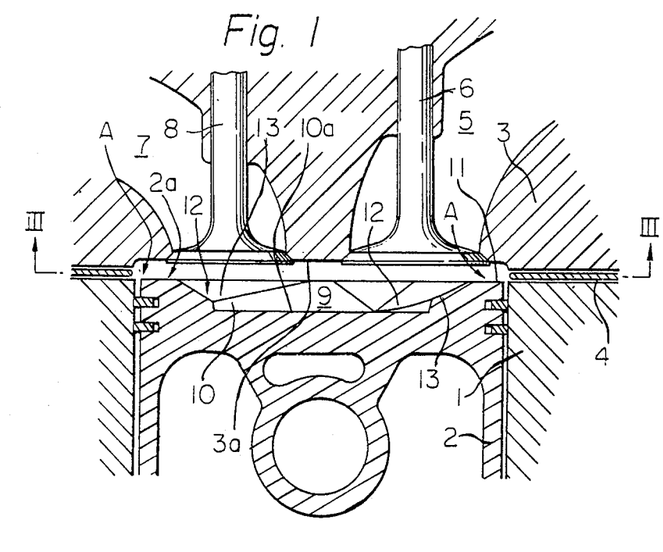
FIG. 1 is a cross-sectional side view of an embodiment of an internal combustion engine according to the present invention.
Figure 2:
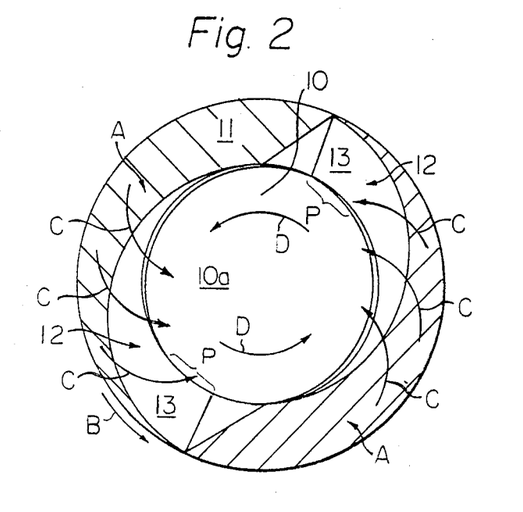
FIG. 2 is a plane view of the piston shown in FIG. 1.
Figure 3:
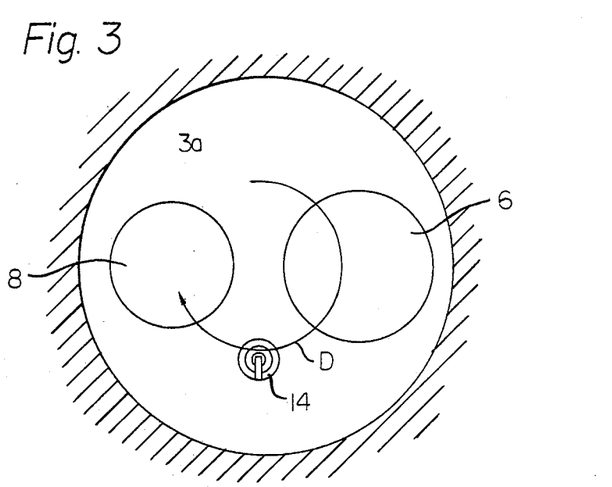
FIG. 3 is a bottom view of the cylinder head, taken along the line III—III in FIG. 1.

Referring to FIG, 1, 1 designates a cylinder block, 2 a piston reciprocally movable in the cylinder block, 3 a cylinder head fixed onto the cylinder block 1 via a gasket 4, 5 an intake port, 6 an intake valve, 7 an exhaust port and 8 an exhaust valve. The intake port 5 is connected to for example, a carburetor forming a lean air-fuel mixture having an air-fuel ratio of 18 through 20:1, or to a carburetor forming a mixture having an approximately stoichiometric air-fuel ratio. When the latter carburetor is used, it is preferable to provide the engine with an exhaust gas recirculating device for recirculating the exhaust gas from the exhaust system into the intake system of the engine, and to recirculate a large amount of the exhaust gas of more than ten percent relative to an amount of an air-fuel mixture of an approximately stoichiometric air-fuel ratio fed into the cylinder of the engine. A circularly-shaped recess 10 is formed on the central portion of the top surface 2a of the piston 2. This recess 10 together with the inner wall 3a of the cylinder head 3 forms a combustion chamber 9 when the piston 2 reaches the top dead center. A ring-shaped flat portion 11 is formed on the peripheral portion of the top surface 2a of the piston 2. On the other hand, the cylinder head 3 has the flat inner wall 3a. Consequently, when the piston 2 reaches the top dead center, a squish area A indicated by the hatchings in FIG. 2 is formed between the flat inner wall 3a of the cylinder head 3 and the ring-shaped flat surface portion 11 of the piston 2. A pair of grooves 12 extending along the circumferential direction B (see FIG. 2) of the piston 2 is formed on the ring-shaped peripheral surface portion 11 so that the cross-sectional area of the groove 12 is gradually increased along the circumferential direction B. In addition, these grooves 12 are so formed that the bottom surfaces 13 of the grooves 12 are downwardly inclined towards the circularly-shaped recess 10 and continues to the bottom surface 10a of the recess 10 over the range P in which the cross-sectional areas of the grooves 12 reach a maximum value.

At the time of the intake stroke, a combustible mixture is introduced into the combustion chamber 9 formed between the inner wall 3a of the cylinder head 3 and the top surface 2a of the piston 2 from the intake port 5. Then, at the time of the compression stroke, the combustible mixture in the combustion chamber 9 is compressed as the piston 2 moves upwards. When the piston 2 reaches a position near to the top dead center, the combustible mixture in the squish area A is pushed out from the squish area A into the recess 10, thus causing a squish flow of the combustible mixture. At this time, since the grooves 12 are so formed that the cross-sectional area of the grooves 12 are gradually increased along the circumferential direction B, the squish flow having a velocity component of the circumferential direction B is pushed out as shown by the arrlow C in FIG. 2. As mentioned above, the grooves 12 are directly connected to the bottom surface 10a of the recess 10 at the portion in which the cross-sectional area of the grooves 12 is maximum. Consequently, a strong swirl motion of the combustible mixture shown by the arrow D is created in the entire space of the combustion chamber 9, and then the swirled combustible mixture is ignited by a spark plug 14 (see FIG. 3).

The squish flow simultaneously causes the turbulence and the swirl motion of the combustible mixture in the combustion chamber 9. As a result of this, since the turbulent burning is effected, the velocity of the combustion is increased and the combustion is stabilized. Consequently, even if a lean air-fuel mixture is used, a stable combustion can be obtained, and even if a combustible mixture contains a large amount of the recirculated exhaust gas therein, since the recirculated exhaust gas is fully mixed with an air-fuel mixture due to the squish flow, a stable combustion can be obtained. As is shown in FIG. 3, it is preferable that the spark plug 14 be arranged in the peripheral portion of the swirl motion at a position located in the vicinity and upstream of the exhaust valve 8 with respect to the flow direction D of the combustible mixture.

Since the exhaust valve 8 is directly exposed to the exhaust gas discharged via the exhaust valve 8, the temperature of the exhaust valve 8 becomes higher than that of the inner wall 3a of the cylinder head 3. Particularly, the valve face of the exhaust valve 8 exposed to the combustion chamber 9 has a tendency to create a hot spot thereon, thus causing detonation due to the presence of this hot spot. However, by positioning the spark plug 14 as mentioned above, the combustible mixture ignited by the spark plug 14 immediately reaches the valve face of the exhaust valve 8, thus burning the combustible mixture existing around the valve face of the exhaust valve 8, thereby preventing the occurrence of detonation.

Figure 4:
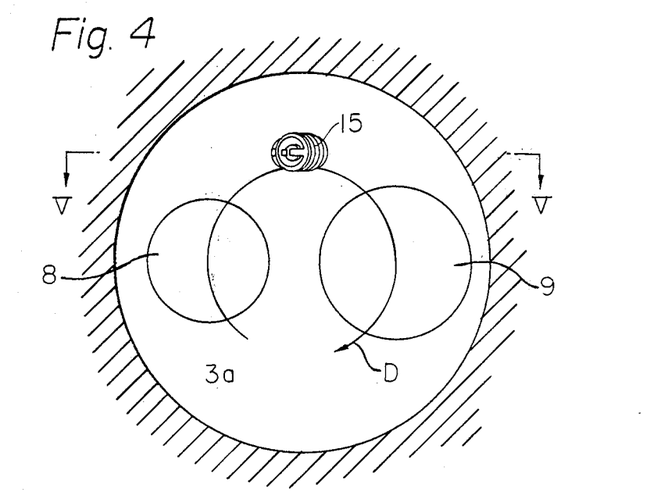
FIG. 4 is a bottom view of a cylinder head showing another embodiment of FIG. 1.
Figure 5:
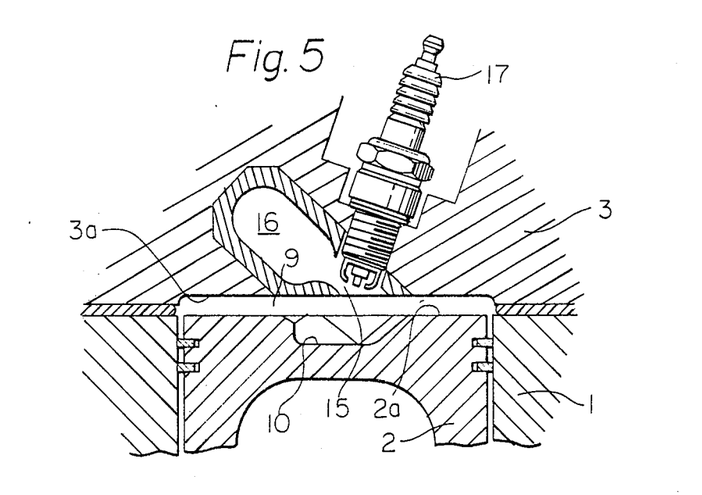
FIG. 5 is a cross-sectional view taken along the line V—V in FIG. 4.

FIGS. 4 and 5 show another embodiment of FIG. 1. This embodiment is different from that of FIG. 1 in points wherein an auxiliary combustion chamber 16 connected to the combustion chamber 16 via a connecting passage 15 is provided and the spark gap of a spark plug 17 is located in the connecting passage 15. The description of the construction of the top surface 2a of the piston 2 is omitted because the top surface 2a shown in FIGS. 4 and 5 has the same construction as that in FIG. 1. In the embodiment shown in FIGS. 4 and 5, at the time of the compression stroke, a combustible mixture in the combustion chamber 9 is forced into the auxiliary combustion chamber 16 via the connecting passage 15. Then, the combustible mixture introduced into the auxiliary combustion chamber 16 is ignited by the spark plug 17, whereby a burning jet is injected from the connecting passage 15 into the combustion chamber 9. Similar to the manner as described hereinbefore, the swirl motion of a combustible mixture is created in the recess 10, and the swirled combustible mixture is ignited by the burning jet. It is preferable that the burning jet be injected along the flow direction D of the swirled combustible mixture in the peripheral portion of the swirl motion of the combustible mixture. Consequently, in this embodiment, the connecting passage 15 opens to the combustion chamber 9 in the peripheral portion of the swirl motion of the combustible mixture and, the connecting passage 15 is so arranged that the angle between the axis of the connecting passage 15 and the flat inner surface 3a of the cylinder head 3 is an acute angle.

Figure 6:
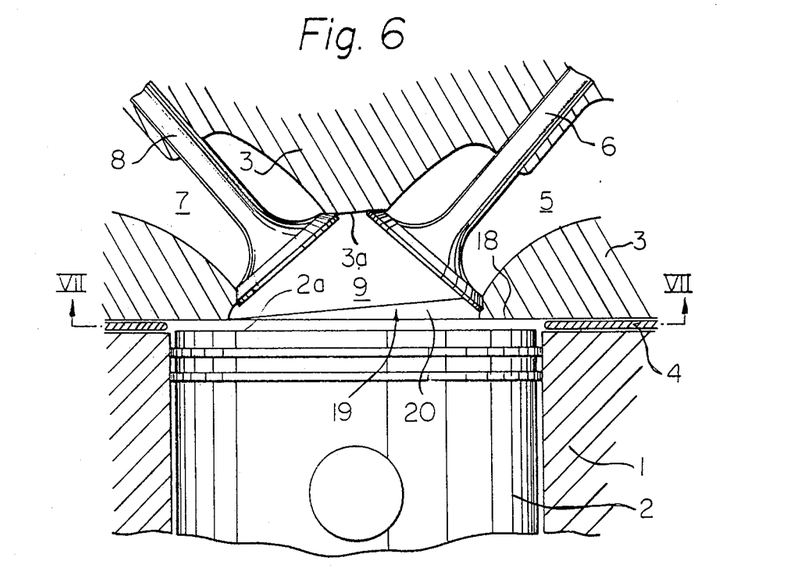
FIG. 6 is a cross-sectional side view of a further embodiment of FIG. 1.
Figure 7:
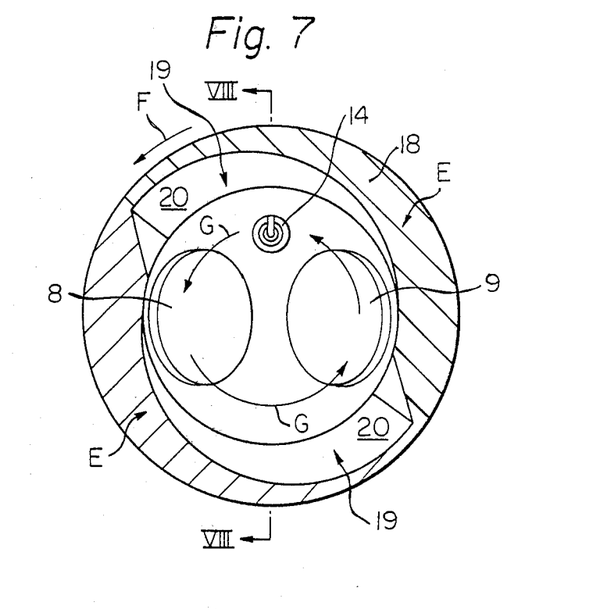
FIG. 7 is a bottom view of the cylinder head, taken along the line VII—VII in FIG. 6.
Figure 8:
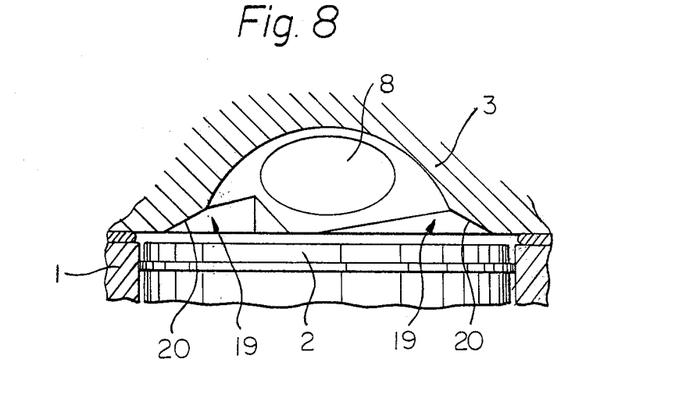
FIG. 8 is a cross-sectional view taken along the line VIII—VIII in FIG. 7.

FIGS. 6 through 8 show a further embodiment of FIG. 1. Referring to FIG. 6, the piston 2 has a flat top surface 2a. The cylinder head 3 has at its central portion a spherical inner surface 3a defining a spherical combustion chamber 9 and has a ring-shaped flat surface portion 18 at the peripheral portion of the inner wall 3a of the cylinder head 3. When the piston 2 reaches the top dead center, a squish area E indicated by the hatchings in FIG. 7 is formed between the top surface 2a of the piston 2 and the ring-shaped flat surface portion 18 of the cylinder head 3. A pair of grooves 19 extending along the circumferential direction F (see FIG. 7) is formed on the ring-shaped flat surface portion 18 of the inner wall 3a of the cylinder head 3. In the same manner as described in FIG. 1, the grooves 19 are so formed that the cross-sectional area of the grooves 19 are gradually increased, and the bottom surface 20 of the grooves 19 are upwardly inclined towards the combustion chamber 9. Consequently, a squish flow of the combustible mixture created at the time of the compression stroke causes the turbulence of the combustible mixture in the combustion chamber 9 and, at the same time, causes a swirl motion of the combustible mixture as shown by the arrow G in FIG. 7.

Figure 9:
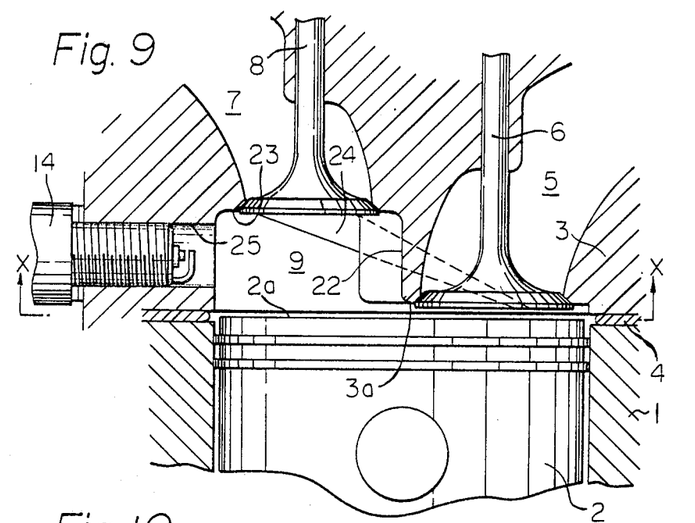
FIG. 9 is a cross-sectional side view of a still further embodiment of FIG. 1, taken along the line IX—IX in FIG. 10.
Figure 10:
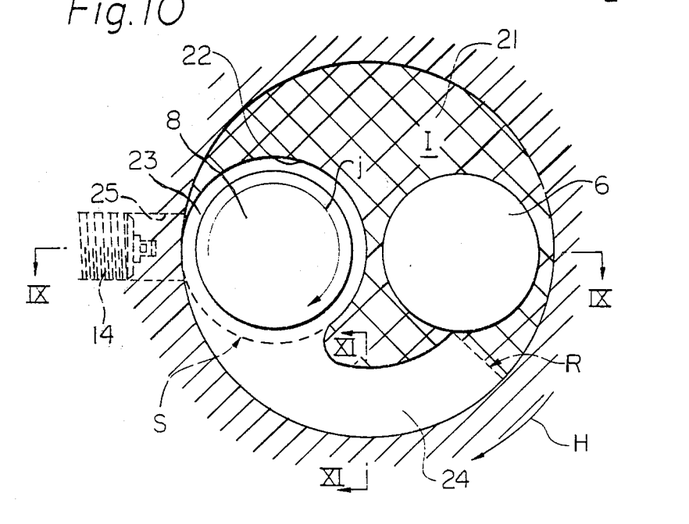
FIG. 10 is a bottom view of the cylinder head, taken along the line X—X in FIG. 9.
Figure 11:
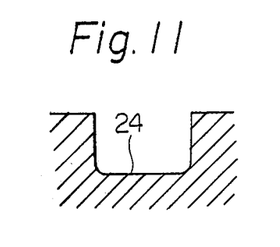
FIG. 11 is a cross-sectional view taken along the line XI—XI in FIG. 10.

FIGS. 9 through 11 show a still further embodiment of FIG. 1. Referring to FIG. 9, the piston 2 has a flat top surface 2a. On the other hand, a flat surface portion 21 indicated by the hatchings in FIG. 10, a cylindrical recess 22 and an inclined groove 24 are formed on the inner wall 3a of the cylinder head 3. The cylindrical recess 22 defines the combustion chamber 9 when the piston 2 reaches the top dead center. The inclined groove 24 extends from the flat surface portion 21 along the circumferential direction H (see FIG. 10) and is tangentially connected to the cylindrical peripheral wall of the cylindrical recess 22. This inclined groove 24 has a rectangular cross section as shown in FIG. 11. In addition, the inclined groove 24 is smoothly connected to the flat surface portion 21 at a position R shown by the broken line in FIG. 10, and to the bottom surface 23 of the cylindrical recess 22 at a position S shown by the broken curved line. A threaded hole 25 opening to the combustion chamber 9 is formed on the inner wall 3a defining the cylindrical recess 22 at a position near to the exhaust valve 8. The spark plug 14 is screwed into the threaded hole 25 so that the spark gap of the spark plug 14 does not project into the combustion chamber 9. When the piston 2 reaches the top dead center, a squish area I indicated by the cross hatchings in FIG. 10 is formed between the top surface 2a of the piston 2 and the flat surface portion 21 of the inner wall 3a of the cylinder head 3.

At the time of the intake stroke, a combustible mixture is introduced into the combustion chamber 9 formed between the inner wall 3a of the cylinder head 3 and the top surface 2a of the piston 2 via the intake valve 6. Then, at the time of the compression stroke, the combustible mixture introduced into the combustion chamber 9 is gradually compressed as the piston 2 moves upwards. When the piston 2 reaches a position near to the top dead center, a combustible mixture is pushed out into the cylindrical recess 22 defining the combustion chamber 9 from the squish area I via the inclined groove 24. Then, this combustible mixture flows along the cylindrical peripheral wall defining the cylindrical recess 22; thus, a swirl motion of the combustible mixture as shown by the arrow J in FIG. 10 is created in the cylindrical recess 22 defining the combustion chamber 9. Then, the swirled combustible mixture is ignited by the spark plug 14.

Instead of connecting the inclined groove 24 to the bottom surface 23 of the cylindrical recess 22, the inclined groove 24 can be arranged so that the inclined groove 24 is opened to the halfway region of the cylindrical recess 22. However, in this case, since the depth of the inclined groove 24 becomes shallow over the entire length of the groove 24 and the inclined angle of the inclinded groove 24 becomes small compared with the depth and the inclined angle in an embodiment of FIG. 9, a strong swirl motion of a combustible mixture cannot be created. Contrary to this, in the present invention, the depth of the inclined groove 24 is relatively deep and the inclined angle of the inclined groove 24 is relatively large. In addition, the length of the inclined groove 24 is relatively long. Thus, in the present invention, a strong swirl motion of a combustible mixture can be obtained. Furthermore, as mentioned above, if the inclined groove 24 is opened to the halfway region of the cylindrical recess 22. The residual exhaust gas caused by the combustion in the preceeding cycle and remaining the recess 22 around the exhaust valve 8 is not fully mixed with the squish flow of the combustible mixture flowing along the inclinded groove 24, whereby a stable combustion cannot be obtained. However, in the present invention, since the inclined groove 24 is connected to the bottom surface 23 of the cylindrical recess 22, the residual exhaust gas caused by the combustion in the preceeding cycle and remaining in the recess 22 around the exhaust valve 8 can be fully mixed with the flow of the combustible mixture, whereby a stable combustion can be obtained. In addition, by connecting the inclined groove 24 to the bottom surface 23 of the cylindrical recess 22, a squish flow of the combustible mixture having a relatively low temperature can directly impinge upon the valve face of the exhaust valve 8 which has a tendency to create a hot spot thereon, thereby cooling the exhaust valve 8 and thus preventing the occurrence of detonation. Furthermore, by retracting the electrode of the spark plug 14 into the inside of the threaded hole 25, it is possible to prevent a strongly swirled combustible mixture from directly impinging against the electrode of the spark plug 14, thus preventing the occurrence of misfire.

In the embodiment shown in FIG. 9, a strong squish flow of a combustible mixture simultaneously causes the turbulence and the strong swirl motion of the combustible mixture in the cylindrical recess 22. As a result of this, the residual exhaust gas remaining in the cylindrical recess 22 can be fully mixed with the combustible mixture, thus greatly increasing the velocity of the combustion. In addition, since the spark gap of the spark plug 14 is located in the vicinity of the exhaust valve 8, the flame of the combustible mixture ignited by the spark plug 14 immediately reaches the combustible mixture existing around the valve face of the exhaust valve, thereby preventing the occurrence of detonation.

Figure 12:
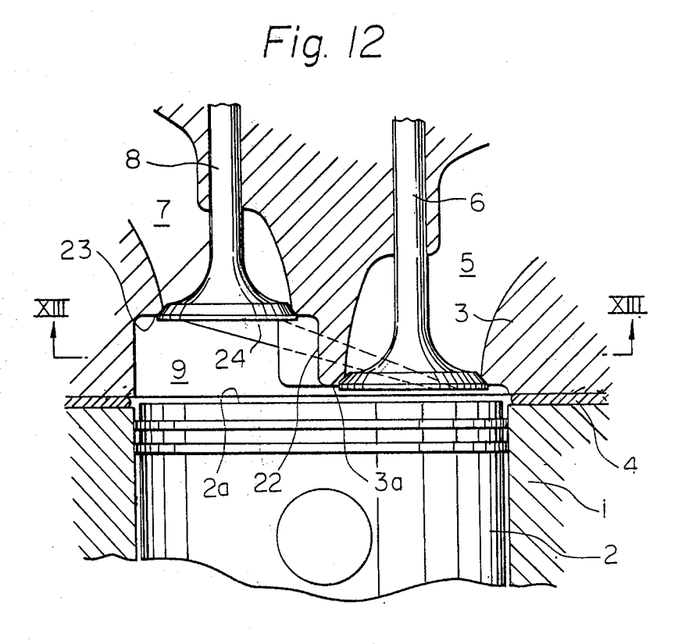
FIG. 12 is a cross-sectional side view of another embodiment of FIG. 9.
Figure 13:
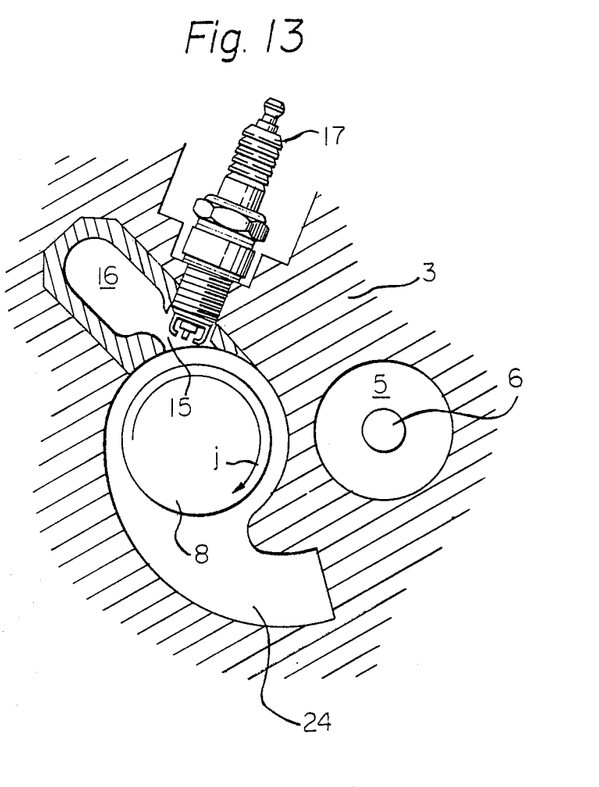
FIG. 13 is a cross-sectional view taken along the line XIII—XIII in FIG. 12.

FIGS. 12 and 13 show another embodiment of FIG. 9. In this embodiment, an auxiliary combustion chamber 16 connected to the combustion chamber 9 via a connecting passage 15 is provided, and the spark gap of the spark plug 17 is located in the connecting passage 15. At the time of the compression stroke, the combustible mixture in the combustion chamber 9 is forced into the auxiliary combustion chamber 16 via the connecting passage 15 and, then, the combustible mixture introduced into the auxiliary combustion chamber 16 is ignited by the spark plug 17, whereby a burning jet is injected into the combustion chamber 9 from the connecting passage 15. The connecting passage 15 is so arranged that a burning jet is injected into the combustion chamber 9 in the flow direction J (see FIG. 13) of the swirled combustible mixture.

According to the present invention, the turbulence and the strong swirl motion of a combustible mixture can be created due to a strong squish flow of a combustible mixture. Consequently, even if a combustible mixture is a lean air-fuel mixture or a mixture containing a large amount of the recirculated exhaust gas therein, the velocity of the combustion can be increased, thereby obtaining a stable combustion and reducing an amount of harmful components in the exhaust gas. At the same time, the occurrence of detonation can be prevented.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block,
   a cylinder head mounted on said cylinder block,
   a piston reciprocally movable in said cylinder block, said cylinder head and said piston defining a combustion chamber having a fixed volume therebetween when said piston reaches the top dead center position,
   an intake valve in said cylinder head for leading a combustible mixture into said combustion chamber, an exhaust valve in said cylinder head for discharging the exhaust gas to the atmosphere, said combustion chamber comprising a first region which forms a substantial combustion chamber and has a circumferential wall and a bottom wall, said combustion chamber further comprising a second region for creating a squish flow of a combustible mixture and a third region communicating said first region with said second region and guiding said squish flow towards the circumferential direction of said piston for causing a direct impingement of said squish flow upon the bottom wall of said first region and for creating a turbulence and a strong swirl motion of the combustible mixture in said first region, said piston has a substantially flat top surface and said cylinder head has an inner wall having a flat surface portion, said first region being defined by a recess formed on the inner wall of said cylinder head, said second region being defined by the flat top surface of said piston and by the flat surface portion of said cylinder head, said third region being defined by at least one gradually inclined groove formed on the flat surface portion of the inner wall of said cylinder head;

said recess has a circumferential cylindrical wall and a bottom wall and is formed on the periphery of the inner wall of said cylinder head, said groove extending along the periphery of the flat surface portion of the inner wall of said cylinder head and opening into said recess tangentially to the circumferential cylindrical wall of said recess, said groove having a bottom surface upwardly inclined towards and terminating at the bottom wall of said recess, the bottom surface of said groove being directly connected to the bottom wall of said recess and being substantially uniformly inclined throughout its extent;

wherein said intake valve is disposed in the flat portion of the cylinder head, while said exhaust valve is disposed in the bottom wall of said recess; and a spark plug having a spark gap in said combustion chamber.

2. An internal combustion engine as claimed in claim 1, wherein said groove has a rectangular cross section.

3. An internal combustion engine as claimed in claim 1, wherein a hole is formed on the circumferential cylindrical wall of said recess, the spark gap of said spark plug is located in said hole.

4. An internal combustion engine as claimed in clam 1, wherein said combustion chamber comprises a main combustion chamber, an auxiliary combustion chamber and a connecting passage communicating said auxiliary combustion chamber with said main combustion chamber, said connecting passage opening into said main combustion chamber on the circumferential cylindrical wall of said recess, the opening of said connecting passage being directed towards the flow direction of the swirled combustible mixture in said recess, the spark gap of said spark plug being located in said connecting passage.

* * * * *